United States Patent
Pawar et al.

(10) Patent No.: US 10,401,902 B1
(45) Date of Patent: Sep. 3, 2019

(54) ELECTRONIC DEVICE WITH LOCKING DISPLAY

(71) Applicant: Amazon Technologies, Inc., Seattle, WA (US)

(72) Inventors: Sourabh Pawar, Seattle, WA (US); Kok Yen Cheng, Sunnyvale, CA (US); Garrett A. Schwanke, Seattle, WA (US); Hao Tan, Seattle, WA (US); Alexander Hu, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 3 days.

(21) Appl. No.: 15/828,296

(22) Filed: Nov. 30, 2017

(51) Int. Cl.
*G06F 1/16* (2006.01)
*G06F 3/041* (2006.01)
*G06F 1/18* (2006.01)

(52) U.S. Cl.
CPC .......... *G06F 1/1605* (2013.01); *G06F 1/1643* (2013.01); *G06F 3/0412* (2013.01); *G06F 1/181* (2013.01); *G06F 1/189* (2013.01)

(58) Field of Classification Search
CPC .... G06F 1/1605; G06F 3/0412; G06F 1/1643; G06F 1/189; G06F 1/181; G02F 1/133308
See application file for complete search history.

(56) References Cited

U.S. PATENT DOCUMENTS

| | | | |
|---|---|---|---|
| 2002/0125815 A1* | 9/2002 | Wakita | G02F 1/133308 313/491 |
| 2008/0158202 A1* | 7/2008 | Nakamura | A47G 33/08 345/204 |
| 2010/0061039 A1* | 3/2010 | Sanford | H05K 5/0013 361/679.01 |
| 2013/0258702 A1* | 10/2013 | Kim | G02B 6/0091 362/602 |
| 2016/0081207 A1* | 3/2016 | Broadbent | F16M 11/14 361/807 |
| 2016/0086577 A1* | 3/2016 | Broadbent | G01C 21/265 345/690 |
| 2018/0032104 A1* | 2/2018 | Schatz | G06F 1/1632 |

* cited by examiner

*Primary Examiner* — Steven T Sawyer
*Assistant Examiner* — Sagar Shrestha
(74) *Attorney, Agent, or Firm* — Lee & Hayes, P.C.

(57) ABSTRACT

An electronic device including a hollow housing and a display assembly. The hollow housing includes a wall, a circular opening disposed through the wall, and a first attachment mechanism positioned on the housing proximate to the circular opening. The display assembly includes a circular display screen and a display frame coupled to the circular display screen. The display frame is disposed within the circular opening and has a second attachment mechanism disposed proximate a periphery of the display frame to engage the first attachment mechanism and secure the display assembly to the hollow housing.

20 Claims, 9 Drawing Sheets

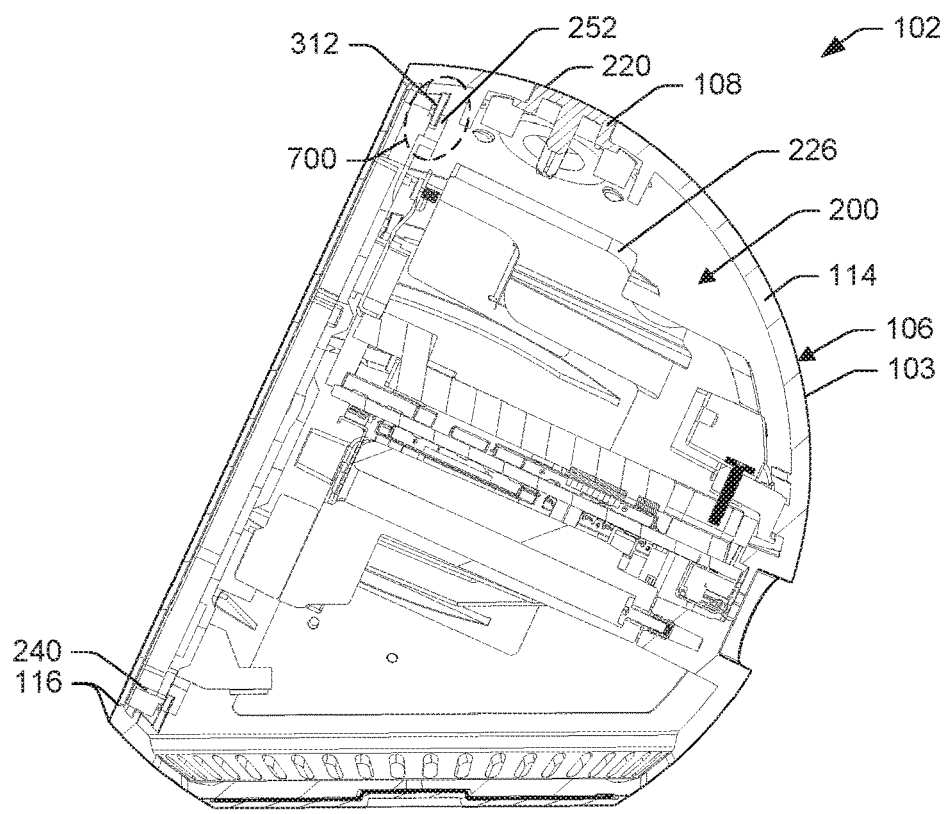
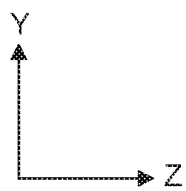

ELECTRONIC DEVICE WITH LOCKING DISPLAY

BACKGROUND

Homes are becoming more connected with the proliferation of computing devices, such as desktop and laptop computers, tablets, entertainment systems, and portable communication devices. While these computing devices may come in different shapes and sizes, manufacturing techniques often limit their design. For instance, given the difficulty in manufacturing and assembly, computing devices may lack spherically-shaped portions and/or may be constructed of multiple pieces that are then assembled together. These construction techniques may detract from the aesthetic appearance of such devices and may increase the cost of manufacturing such devices.

As a result, many existing computing devices may have similar, basic, or planar appearances. In addition, the limited shapes and designs of computing devices may lack user-friendliness or may detract from an aesthetic appearance of an environment within which the computing devices reside.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 7 is a cross-sectional view of the assembly of the example spherical electronic device of FIG. 1, taken along line B-B of FIG. 6B.

DETAILED DESCRIPTION

Figure 1:
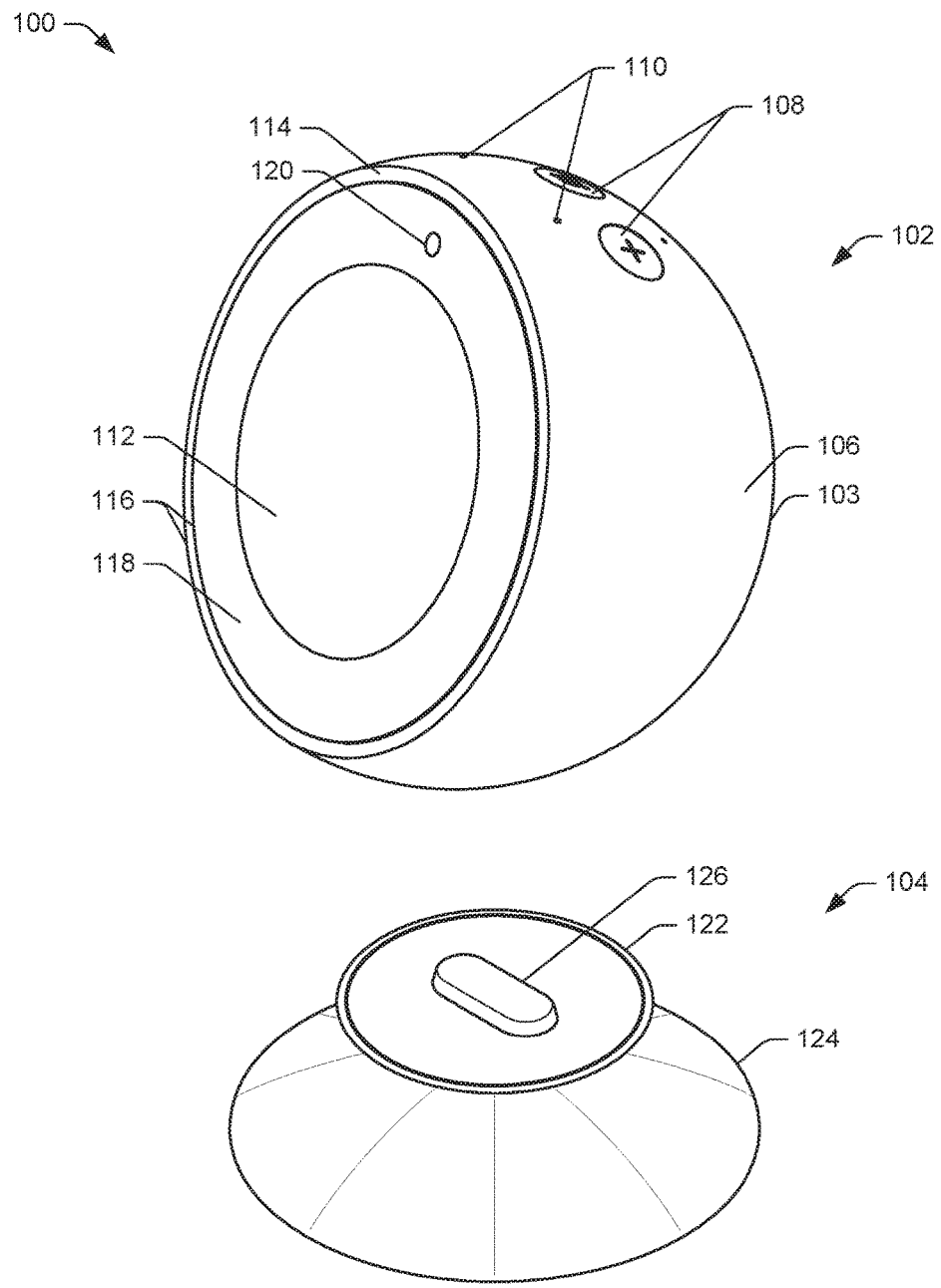
FIG. 1 perspective view of an example spherical electronic device.

As discussed above, existing computing devices may not be aesthetically appealing and may lack user-friendliness given their limited appearances caused by conventional manufacturing techniques. For instance, manufacturing techniques and cost considerations may limit the prevalence of spherically-shaped electronic devices. As a result, many existing devices opt for more traditional, generally planar geometries (e.g., tablets, phones, displays, etc.), potentially detracting from an appearance of the computing device.

This application describes electronic devices with non-traditional geometries and constructions. In some examples, electronic devices according to this application include a circular display that is rotatable relative to a housing to lock the display to the housing. In some examples, the housing may be a single-piece housing and at least a portion of the housing may be substantially spherical in shape. An opening may be disposed in the substantially spherical portion of the housing to receive the circular display screen. The opening in the housing may have a diameter smaller than a diameter of the substantially spherical portion of the housing, thereby creating an undercut within the housing. In some examples, electronic devices according to this application may include buttons disposed in the housing and arranged so that their exterior surfaces generally match a contour of the substantially spherical portion of the housing. That is, the buttons may be spaced apart from one another and arranged such that the exterior surface of each button is tangent to a substantially spherical portion of the housing surrounding the respective button. In some instances, the exterior surface of the buttons may be convex-shaped so as to match a curvature of the substantially spherical portion of the housing, while in other instances the exterior surface of the buttons may be flat or concave.

By way of example and not limitation, electronic devices according to this application may include an assembly having a housing within which internal components are disposed, and a display sub-assembly that attaches to the housing of the assembly. The assembly may be configured to reside on a base or stand, so as to position the electronic device within an environment. In some instances, the housing may include non-planar geometries, such as spherically-shaped portions, resulting in the electronic device having unique and interesting profiles while maintaining simple manufacturing and assembly techniques.

In some instances, the housing may have a hollow interior or cavity. The housing may include a wall having an interior surface and an exterior surface. The housing may take a plurality of shapes and profiles, including being cylindrical, rectangular, hexagonal, spherical, planar, or any combination thereof. In some instances, the housing may also include a unibody housing (i.e., a single-piece molded housing) or may include separate halves or portions that are coupled to one another.

An opening may extend between the interior surface of the housing and the exterior surface of the housing or, stated another way, the opening may extend through the wall (i.e., thickness) of the housing. In this sense, the interior surface or the cavity of the housing is accessible through the opening. The opening may resemble any shape or outline, including being circular or square, for example. In some instances, the opening may be planar, so as to extend through the housing along a geometric plane. Alternatively, the opening may extend through the housing at various angles, planes, and/or interfaces. In addition, the opening may be of any size suitable to receive internal components of the electronic device.

In some instances, a size of the opening may be smaller than one or more dimensions of the housing. For instance, a largest cross-sectional distance or area of the housing may be greater than a largest cross-sectional distance or area of the opening. By way of illustration, when at least a portion of the housing of the assembly is spherically-shaped and the opening is circular, a diameter of the housing (i.e., the exterior surface) may be greater than a diameter of the opening. In this sense, because the opening has a diameter that is smaller than a diameter of the housing, the housing may include an undercut.

The opening may have a collar, annulus, or rim that extends between the interior surface of the housing and the exterior surface of the housing, through the wall of the housing. That is, the collar may surround the opening in the housing, and in some instances, may be co-planar with the opening.

In some instances, the undercut may be an internal undercut disposed on the interior surface or within the cavity of the housing. In that case, when viewing the electronic device from a direction perpendicular to the plane of the opening, the undercut refers to the region that is obstructed or obscured from view by the annulus or collar of and/or surrounding portions of the housing. In some instances, the shape of the undercut may be curved, straight, or may follow an internal profile of the interior surface of the housing.

As mentioned previously, the housing may include a unibody or multiple sections that are coupled together so as to form the exterior surface and the interior surface of the housing. In instances where the housing includes a single-piece molded unit (i.e., unibody), the undercut may be described as an undercut in the sense that it prohibits the ejection of the housing from a mold, in injection molding, for instance. However, when the housing includes multiple sections that are coupled together, the housing may still be said to have the undercut.

The assembly of the electronic device may include internal components that are disposed within the housing. For instance, the internal components may be disposed within the cavity of the housing. The internal components may provide functionality to the assembly of the electronic device and configure the electronic device to receive one or more of touch, gesture, or speech-based input. The internal components may be sized to fit within the housing and mount, attach, or otherwise couple thereto. In some instances, the internal components may be sized and configured to be placed through and/or fit within the opening of the housing. Accordingly, after fitting through the opening, the internal components may be mounted, secured, or otherwise coupled to the housing of the assembly.

By way of example and not limitation, the internal components may include computing components, such as printed circuit boards (PCBs) that have any number of processors, memory, circuits, transformers, power supplies, network interfaces, and so forth. One or more wireless transceivers may be included and configured for communication with other devices, such as mobile phones, tablets, computers, routers, modems, other portable audio input/output devices, and/or any other computing device capable of wireless communication. In addition, the internal components may include, without limitation, microphones, speakers, cameras, buttons, antennas, heat dissipating pads/plates, grounding foam, external connectors (e.g., auxiliary or universal serial bus (USB)), audio/video jacks, lights, etc.

When present, the memory may store one or more software modules or instructions that, when executed by one or more processors, configure the electronic device to perform various operations. For instance, to carry out speech processing, such as automatic speech recognition (ASR) or natural language understanding (NLU), speech synthesis may be performed by the internal components. By way of illustration, a user may verbally request the electronic device to perform a particular task, such as to play music. The electronic device may process the user's command and cause one or more operations to be performed, such as playing the requested music over a loudspeaker of the electronic device. In some instances, to accomplish the operations performable by the electronic device, the internal components may be used in conjunction with network-based support services.

While the electronic device and/or the assembly may be powered through an external power source, in some instances, the internal components may include a rechargeable battery, enabling the assembly and/or the electronic device to operate without connection to the external power source. However, the assembly and/or the electronic device may also be used with a power cord that provides external electrical power to the battery for recharging.

To support and secure the internal components to the housing of the assembly, the housing may also include frames, mounts, and/or sub-assemblies. That is, because the dimensions of opening of the housing may be sized smaller than the exterior dimensions of the housing (i.e., the undercut), it may be difficult to attach the internal components to interior surfaces of the housing. Therefore, the internal components may be coupled to frames outside of the housing, and then inserted, as a sub-assembly, into the housing. By way of example, the assembly may include a chassis to which some of the internal components mount, such as the PCB. Accordingly, the PCB may be mounted to the chassis first, and then the chassis, which includes internal components mounted thereto, may be inserted into the housing as a sub-assembly via placing the chassis through the opening in the housing.

The frames may be sized and configured to be inserted through the opening of the housing and attach to the interior surface. In some instances, the frames may also communicatively, electrically, and/or thermally couple or link the internal components of the assembly to one another.

In some examples, the assembly and/or the electronic device may have a sleek, compact, and aesthetic appearance. To accomplish this, the internal components may be integrated into the housing in such a way that the internal components are packed tightly or efficiently within the housing. At least some of the components within the electronic device may generate heat. By way of example and not limitation, the processor(s), camera(s), power supply, and wireless modules generate heat during use. Without effectively dispersing or dissipating this heat, the internal components, such as a camera, may be adversely effected and become uncappable of performing its intended function (e.g., capturing gestures used for command recognition). However, without forfeiting an appearance or compactness of the assembly and/or the electronic device, it may be difficult to effectively disperse generated heat.

To efficiently dissipate heat generated by the internal components, heat dissipating elements may be included within the housing to transmit heat away from generating sources toward an exterior of the housing and/or to uniformly distribute the heat over the surface area of the electronic device. For instance, heat dissipating elements may disperse heat from the light sources, PCBs, or other internal components within the housing. In some instance, the frames, such as the chassis on which the PCB is mounted, may have heat dissipating properties that transfer heat away from the PCB. Alternatively, or additionally, the internal components may couple to heat dissipating plates that are disposed on the interior surface of the housing, such that the heat dissipating plates transfer and diffuse localized heat from the internal components. In some instances, the frames, such as the chassis holding the PCB, may contact or couple to the heat dissipating plates located on the interior surface of the housing.

As mentioned previously, the electronic device may include microphones that capture sound within an environment. In some instances, the microphones may be located within the cavity of the housing of the assembly. To capture sound from the environment, microphone ports may be located through the wall of the housing, in between the interior surface and the exterior surface. Accordingly, the microphone ports may direct sound or allow sound to reach the microphones. That is, the microphones disposed within the housing of the assembly may receive sound, for instance, user speech, via the microphone ports placed throughout the housing. In some instances, to more effectively capture the sound, the microphone ports may be aligned with the microphones, vice versa.

In some instances, the microphones and/or the microphone ports may be surrounded or encased with foam that acoustically seals the microphones to prevent acoustic signals from interfering with those being received via other portions of the electronic device. For example, various sounds associated with the click of the buttons may be minimized and acoustically isolated from the microphones.

The assembly of the electronic device may include buttons that are used to control or operate the electronic device. The buttons may be disposed through the wall of the housing, between the exterior surface and the interior surface, and may electrically couple to PCBs. In some instances, the buttons may correspond to a power button, a wireless connectivity button, a mute button, volume buttons, sync buttons, or any other type of button or control. The buttons may be mechanical (e.g., having physically movable components) and/or electronic (e.g., capacitive sensors, optical sensors, touch screen, or the like).

In some instances, the electronic device may have a talk button that is pressed when a user speaks a command. That is, while the talk button is pressed, the electronic device may capture user audio and provide the user audio to a speech support service server. The speech support service server may perform ASR and/or NLU to determine the user's command. Upon identifying the user's command, the electronic device may output a response, cause actions to be performed (e.g., playing music or ordering movie tickets), or elicit feedback from the user. However, in some examples, the user may indicate a request by prefacing the request with a predefined keyword, such as a wakeword or trigger expression, with or without actuating the talk button.

An exterior surface or profile of each button may be substantially tangent, flush and/or co-planar with the portion of the exterior surface of the housing surrounding the respective button. In some instances, a centerline of each button may be oriented normal to the portion of the exterior surface of the housing surrounding the respective button. Accordingly, given the flushness or orientation of the buttons, the exterior surface of the housing may be smooth and uniform. To illustrate, and by way of example, when the exterior surface of the housing is spherically-shaped or substantially spherically-shaped, the exterior surface of the buttons may be oriented normal to the exterior surface of the housing, such that the buttons follow a curvature, bend, or arc of the exterior surface. That is, in some instances, the centerline of the respective buttons may be normal to the exterior surface of the housing. In this sense, because of the orientation of the buttons and/or exterior surface of the buttons, the exterior surface of the housing may be continuous or uniform in that the exterior surfaces of the buttons generally match the curvature of the exterior surface.

In instances where the housing includes more than one button, each of the buttons may be oriented normal to the exterior surface of the housing. The buttons may be arranged or aligned along an axis or arc, may be of similar or different sizes, and/or may be evenly spaced apart from one another.

The buttons may have button covers that are positioned on the buttons and disposed on the exterior surface of the housing. That is, the button covers may be oriented tangentially to the exterior surface of the housing. Accordingly, to create the uniform exterior surface, exterior surfaces of the button covers may arc or curve with the exterior surface of the housing. The button covers may also have symbols that visually indicate their associated function.

Given that the buttons may be oriented tangentially to the exterior surface, by way of the centerline or the exterior surface of the buttons, when the buttons are pressed, they may travel in the same direction (i.e., normal to the exterior surface). That is, a first button may travel in a first direction substantially perpendicular to the exterior surface of the first button while a second button may travel in a second direction substantially perpendicular to an exterior surface of the second button. Accordingly, in some instances, because the first button and the second button travel in directions substantially perpendicularly to the exterior surface of the housing, thereby following a curvature of the exterior surface, the directions of travel of the first and second buttons may be different.

The buttons may align with a button sub-assembly included within the cavity of the housing of the assembly. In some instances, the button sub-assembly may couple to the interior surface of the housing and may mirror a profile of the interior surface. For instance, when a portion of the interior surface of the housing is curved, the button sub-assembly may have at least a portion of its surface that is complimentary (has the same or similar curvature) to the interior surface of the housing.

The button sub-assembly may have receptacles or openings that align with the buttons disposed through the wall of the housing. That is, the receptacles on the button sub-assembly may align within button holes through the housing in which the buttons extend. The button sub-assembly may assist in securing the buttons to the housing and/or may assist in aligning buttons on/within the housing. In some instances, the button sub-assembly may also orient an exterior surface of the buttons normal to the exterior surface of the housing, and/or may assist in providing a mechanical stroke and/or action to the buttons.

The housing may include a stand that situates the assembly and/or the electronic device within an environment. In some instances, the stand may be planar, such that the assembly and/or the electronic device rests flat within the environment. For instance, when the exterior surface of the housing is substantially spherically-shaped, the stand may prevent the electronic device from rolling within the environment. In addition, the stand may have a rubber foot or grommet that dampens, absorbs, or stabilizes the housing, preventing the assembly and/or the electronic device from rattling, sliding, or repositioning during use.

As the assembly of the electronic device may include speakers to output audio or feedback to the user, the housing may include apertures that extend through the wall of the housing. The apertures may assist in dispersing sound outward and away from the electronic device. In some instances, the apertures may assist is discharging heat from the cavity of the housing. In addition, in some instances, the apertures may be located near the base of the electronic device and/or may encircle or surround the base.

In some instances, the electronic device may also include a mounting platform or stand on which the housing of the assembly couples. The mounting platform may situate the housing, stabilize the housing, or may position the housing within an environment. For instance, the housing may include a seating element that mates or otherwise couples with a corresponding seating element on the mounting platform. That is, the housing may include seating element that aligns and is complementary to engage with a corresponding seating element included on mounting platform, such that when the seating elements couple, the housing is positioned and arranged on the mounting platform. In some instances, the housing may couple to the mounting platform through the base of the housing. Therefore, in some instances, the seating element on the housing may be located on or within the base of the housing.

In some instances, the mounting platform may provide mains power to the internal components with the housing of the assembly. However, as mentioned above, the electronic device may be operable without the mounting platform.

As mentioned previously, the housing may include an opening disposed through the exterior surface or through a wall of the housing. In some instances, the housing may include a display screen that is disposed within the opening of the housing and a display frame to which the display screen is coupled. In some instances, a display sub-assembly may couple to the housing, so as to cover the opening and enclose the cavity of the housing.

To couple the display sub-assembly to the housing, the display sub-assembly may be sized and configured based in part on the opening of the housing. That is, in some instances, depending on size and shape of the opening in the housing, the display sub-assembly may be correspondingly be configured to be disposed within the opening. By way of illustration, when the opening includes a circular opening, all or a portion of the display sub-assembly (i.e., the display frame and the display screen) may also be circular.

Coupling of the display sub-assembly and the housing may come by way of attachment mechanisms disposed on the display sub-assembly and the housing, respectively. For instance, the display frame of the display sub-assembly may couple to the housing through attachment mechanisms disposed on the display frame interacting, engaging, or otherwise coupling with a corresponding attachment mechanism disposed on the housing. In some instances, the attachment mechanism on the display frame and the housing may include one or more of a slot, tab, key, keyway, or other like male and female connectors. For instance, by way of example and not limitation, the display frame may include a key while the housing may include corresponding keyway that engages with the key on the display frame. Therefore, when the attachment mechanism on the display frame (e.g., key) and the attachment mechanism of the housing (e.g., keyway) engage, the display sub-assembly may couple to the housing.

The attachment mechanism on the display frame and the attachment mechanism on the housing may engaged through directional movement, snap-fit, magnets, mechanical fasteners, adhesion, pressure fit, or a combination thereof. For instance, the attachment mechanism on the display frame may couple with the attachment mechanism on the housing when the display sub-assembly, and/or the housing is rotated. That is, the attachment mechanism on the display frame may engage with and secure the display sub-assembly to the housing when the attachment mechanism on the display frame is rotated into contact with the attachment mechanism on the housing. Furthering with the example above, the key on the display frame may include a hook or a tab that is configured to engage with the keyway of the housing, such as a surface of the keyway, in order to couple the display sub-assembly and the housing.

To de-couple or disengage the attachment mechanism on the display sub-assembly and the attachment mechanism on the housing, the display sub-assembly may be rotated in an opposite or different direction than that used to couple the display sub-assembly and the housing. That is, the attachment mechanism on the display frame and the attachment mechanism on the housing may be utilized to form a convenient twist-lock mechanism for attaching and removing the display sub-assembly from the housing. Engaging the attachment mechanism on the display sub-assembly with the attachment mechanism on the housing may enclose or seal access to the cavity of the housing. In some instances, a planarness of the opening may assist in providing the convenient twist-lock mechanism.

In addition, while the above example has been described with a singular attachment mechanism (i.e., key and keyway), in some instances, the display sub-assembly and the housing of the assembly may include any number of attachment mechanisms, respectively.

In some instances, the attachment mechanism on the display sub-assembly may be disposed proximate to a periphery of the display frame. In addition, the attachment mechanism on the housing may be included within the cavity of housing, such as on the interior surface, or may be disposed on the exterior surface as well. However, any combination of the two may also be used. To illustrate, when the attachment mechanism of the housing is positioned on the interior surface, the attachment mechanism may be disposed within the undercut of the housing. Additionally, in some instances, the attachment mechanism on the housing may be positioned proximate or substantially adjacent to the opening, within the collar of the opening. The position of the attachment mechanism of the housing proximate to the opening may allow for convenient and accessible engagement with the attachment mechanism of the display sub-assembly.

The display screen of the display sub-assembly may attach or otherwise couple to the display frame, for instance, using an adhesive layer. In some instances, the display screen may include a liquid crystal display (LCD), a light emitting diode display (LEDD), a plasma display, an electronic ink (e-ink) display, a flexible display, a combination of any of the foregoing, or other display technologies. In some instances, the display screen may be touch sensitive and capable of receiving input by touching the display screen with a finger, hand, thumb, stylus, or other pointing device. In addition, the display screen may include a bezel that surrounds at least a portion of the display screen, behind which components of the display screen may be located (e.g., light guide, light sources, etc.).

The display sub-assembly may also include a camera disposed behind an exterior surface of the display screen and/or within the opening of the housing. The camera may image an environment of the electronic device, may capture images of a user operating a user interface (UI) on the display screen, may detect movements with the environment, such as the user providing gesture commands for the electronic device to perform, or may capture images of the user to be used for facial recognition.

In some instances, when the display sub-assembly is coupled to the housing, the display screen may be disposed within the opening (e.g., within the collar) of the housing or beneath a collar thereof. In some instances, an exterior surface or profile of the display screen may be co-planar or substantially flush with an exterior surface or profile of the opening and/or an exterior surface of the housing. Accordingly, all or a portion of display sub-assembly may also be disposed within the opening of the housing.

Additional details of these and other examples are described below with reference to the drawings.

Example Spherical Electronic Device

FIG. 1 illustrates a perspective view of a partially exploded example spherical electronic device 100, showing an assembly 102 positioned above a stand 104. In some instances, the assembly 102 may include a housing 103 that has an exterior surface 106, one or more buttons 108, one or more microphone ports 110, and a display screen 112.

Beginning with the exterior surface 106 of the housing 103, as shown in FIG. 1, the exterior surface 106 may be spherical or substantially spherically-shaped. However, in some instances, the exterior surface 106 may be shaped differently, such as being cylindrical or rectangular. In general, the exterior surface 106 of the housing 103 may be a smooth, uniform, or continuous surface, thereby creating an aesthetic appearance of the example spherical electronic device 100. In some instances, the exterior surface 106 may be seamless, thus having a unibody housing 103, or may include seams created by coupling multiple portions.

The one or more buttons 108 may be disposed through the exterior surface 106 of the housing 103 and into an internal cavity or hollow portion of the housing 103 (i.e., beneath the exterior surface 106). As shown, an exterior surface of the one or more buttons 108 may be oriented tangentially to the exterior surface 106 of the housing 103, so as to complement the smooth and uniform appearance of the example spherical electronic device 100. That is, the exterior surface of the one or more buttons 108 may be substantially flush or co-planar with the exterior surface 106 of the housing 103.

The one or more buttons 108 may follow a trajectory, arc, or curvature of the exterior surface 106 such that the one or more buttons 108 have respective centerlines that are oriented normal to a location where the one or more buttons 108 extend through the exterior surface 106 surrounding a respective button. However, in some instances, the one or more buttons 108 may be oriented in a different manner, such as being disposed at other angles relative to the exterior surface 106 of the housing 103.

As shown in FIG. 1, the exterior surface of the one or more buttons 108 may also include visual indications that illustrate the functionalities of the one or more buttons 108 (e.g., plus "+" sign to increase volume).

The one or more microphone ports 110 may be disposed through the exterior surface 106 of the housing 103. The one or more microphone ports 110 may assist in transferring or directing sound that is external to the example spherical electronic device 100 to one or more microphones located within the assembly 102. In some instances, the one or more microphone ports 110 may be located proximate to the one or more buttons 108, such as on a top of the assembly 102, or may be located elsewhere on the assembly 102, the housing 103, or the stand 104. Similar to the one or more buttons 108, the one or more microphone ports 110 may be oriented tangentially to the exterior surface 106 of the housing 103.

The display screen 112 may occupy or be disposed within an opening created through the exterior surface 106 of the housing 103. The opening may extend through the housing 103 between the exterior surface 106 and an interior surface or, stated another way, through a thickness of a wall 114 of the housing 103.

In some instances, the display screen 112 may couple to the housing 103 of the assembly 102 via a twist-lock mechanism disposed on or within the housing 103 and a display frame to which the display screen 112 is coupled. For instance, the display screen 112 may couple to the housing 103 through an engagement between an attachment mechanism disposed on the display frame and a corresponding attachment mechanism disposed on or within the housing 103.

The opening of the housing may create a collar 116 within which the display screen 112 is disposed. In some instances, an exterior surface of the display screen 112 may be substantially flush or co-planar with the collar 116. The planarness of the display screen 112 and the collar 116 may lend to the overall appearance of the example spherical electronic device 100 and/or the assembly 102. However, in some instances, the display screen 112 may be recessed within the collar 116.

As shown in FIG. 1, in some instances a bezel 118 may surround at least a portion of the display screen 112. However, in some instances, the display screen 112 may not include the bezel 118 or may include a differently shaped bezel than that illustrated in FIG. 1.

In addition, FIG. 1 illustrates that a camera 120 may be included on or within the display screen 112, occupying a portion of the bezel 118. In some instances, however, the camera 120 may not be noticeable and may be disposed beneath the exterior surface of the display screen 112. The camera 120 may be configured to capture images of an environment in which the example spherical electronic device 100 resides or may capture user movements, which may be used for gesture recognition.

In some instances, the display screen 112 may include a UI and may be touch sensitive in order to receive corresponding input. In some instances, the user may control an operational state of the example spherical electronic device 100, or other devices that the example spherical electronic device 100 is communicatively connected to, via interacting with the UI presented on the display screen 112.

The stand 104 may include a top portion 122 and a base portion 124. The top portion 122 may engage with a corresponding surface or side of the housing 103, such as the exterior surface 106. In some instances, to engage the housing 103 and the stand 104, the top portion 122 may include a seating element 126 that corresponds to a seating element included on the housing 103. In addition, in some instances, the housing 103 may engage with the stand at a location or surface adjacent or opposite to where the one or more buttons 108 or one or more microphone ports 110 are located through the housing 103 of the assembly 102.

The base portion 124 of the stand 104 may include flanges or other protrusions that position and secure the stand 104 within an environment, such as on a desk, counter, shelf, etc.

Figure 2:
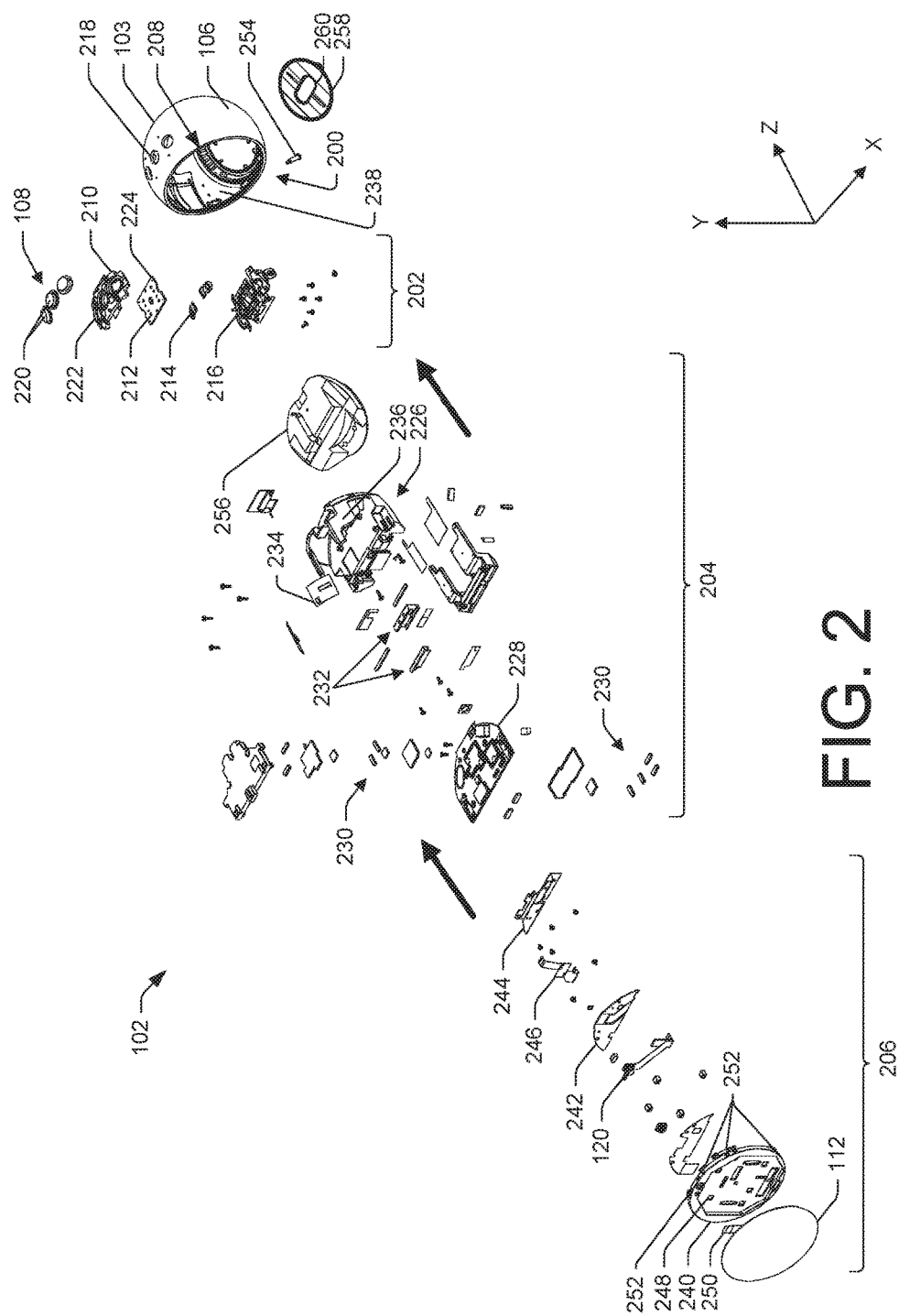
FIG. 2 is an exploded perspective view of an assembly of the example spherical electronic device of FIG. 1.

FIG. 2 illustrates a perspective exploded view of the housing 103 of the assembly 102 of the example spherical electronic device 100 of FIG. 1, showing internal components that are disposed within the housing 103 of the assembly 102. The assembly 102 may include one or more sub-assemblies that may be disposed within an internal cavity 200 of the housing 103. For instance, the assembly 102 may include a button and microphone sub-assembly 202, a chassis sub-assembly 204, and a display sub-assembly 206, each of which is discussed in turn. The Cartesian (X-Y-Z) coordinate system included in FIG. 2 is meant to assist in the discussion of the example spherical electronic device 100 and/or the assembly 102 and will be referenced herein.

The internal cavity 200 of the housing 103 may accessed via an opening 208 extending through the exterior surface 106 of the housing 103, or through the wall 114 (i.e., thickness of the housing 103). In some instances, the opening 208 may be circular, may include other shapes and profiles, and may be sized to receive the sub-assemblies of the assembly 102. That is, the sub-assemblies may be insertable through the opening 208 of the housing 103 and may attach or otherwise couple to the housing 103, such as the interior surface of the housing 103. Discussed in more detail in FIGS. 3A-3C, the opening 208 may be sized smaller than a largest cross-sectional dimension of the housing 103, thereby creating an undercut within the internal cavity 200.

Beginning with the button and microphone sub-assembly 202, in some instances, the button and microphone sub-assembly 202 may include the one or more buttons 108, a button mount 210, one or more microphones 212, one or more flexible printed circuit assemblies (FCPA) 214, and a button and microphone bracket 216.

The one or more buttons 108 may extend through the one or more holes 218 in the housing 103. The one or more holes 218 may be disposed through the wall 114 of the housing 103, between the exterior surface 106 and the interior surface of the housing 103. In some instances, a centerline of an individual hole of the one or more holes 218 may extend through the wall 114 of the housing 103 normal to the exterior surface 106.

When the assembly 102 is assembled, the one or more buttons 108 may be disposed through the one or more holes 218 in the housing 103. In some instances, an individual button of the one or more buttons 108 may be disposed through a corresponding hole of the one or more holes 218. Accordingly, given that in some instances the one or more holes 218 may be tangent to the exterior surface 106 of the housing 103, a centerline of each of the one or more buttons 108 may correspondingly be positioned normal to the exterior surface 106 surrounding a respective button.

FIG. 2 shows that the one or more holes 218, and therefore, the one or more buttons 108, may be disposed along an axis or arc that curves with the exterior surface 106 of the housing 103. The one or more holes 218 may also be equidistantly spaced apart from one another, such that along the arc, each of the one or more buttons 108 may be oriented tangentially to the exterior surface 106. However, in some instances, the one or more holes 218 and the one or more buttons 108 may be arranged differently.

The one or more buttons 108 may include button caps 220 that extend through the wall 114 of the housing 103 and are disposed within the one or more holes 218 of the housing 103. That is, the button caps 220 may be of a similar thickness was the wall 114 of the housing 103. As such, when the one or more buttons 108 are pressed, the button caps 220 may be disposed beneath the exterior surface 106 of the housing 103. However, when the one or more buttons 108 are not being pressed, a top surface (X-Z plane) of the button caps 220 may be substantially flush with the exterior surface 106 of the housing 103.

Discussed in detail later, the button mount 210 may include one or more receptacles 222 that extend through a thickness of the button mount 210. In some instances, the one or more receptacles 222 may correspond to the one or hole holes 218 disposed through the housing 103 such that the one or more receptacles 222 align, co-centrically, with the one or more holes 218. In turn, when the one or more buttons 108 are inserted into the one or more holes 218, the one or more buttons 108 may align with the one or more receptacles 222. To align with the one or more holes 218, the one or more receptacles 222 may also be oriented tangentially to the exterior surface 106 of the housing 103. To accomplish this, the button mount 210 may have a curved upper surface that attaches, mates, or otherwise couples to the interior surface of the housing 103. Accordingly, in some instances, the interior surface of the housing 103 may be partially curved.

As mentioned above with regards to FIG. 1, the one or more microphone ports 110 may extend through the wall 114 of the housing 103. In some instances, the one or more microphone ports 110 may also extend through the button mount 210, such that sound external to the housing 103 may reach the one or more microphones 212 located within the internal cavity 200 of the housing 103 of the assembly 102. In some instances, the one or more microphones 212 may be mounted or otherwise connected to a microphone PCB 224.

The button and microphone sub-assembly 202 may also include mechanisms to give the one or more buttons 108 tactility and mechanical action enabling the one or more buttons 108 to be depressed and returned to a resting state. In some instances, this tactility may come by way of the button mount 210 or the button and microphone bracket 216.

The button and microphone bracket 216 may include PCBs, such as the FCPA 214, that receive input from the one or more buttons 108 and/or the one or more microphones 212. The button and microphone bracket 216 may also couple the one or more buttons 108, the button mount 210, the microphone PCB 224, or the FCPA 214 to the housing 103, so as to secure the button and microphone sub-assembly 202 within the assembly 102.

For ease of assembly, in some instances, the button and microphone sub-assembly 202 may be assembled outside of the housing 103 and then inserted. For instance, the one or more buttons 108 may be coupled to the button mount 210 and may be coupled to the button and microphone bracket 216. Interposed between the button mount 210 and the button and microphone bracket 216 may be the one or more microphones 212 and the FPCA 214. As an assembly, the button and microphone sub-assembly 202 may then be inserted into the housing 103, via the opening 208, and when coupled thereto, the one or more buttons 108 may be disposed through the one or more holes 218 in the housing 103.

The chassis sub-assembly 204 may include a chassis 226 to which one or more components mount. For instance, in some instances, a printed circuit board assembly (PCBA) 228, one or more thermal pads 230, a zero-insertion force (zif) plate 232, and/or one or more antennas 234 may be coupled to the chassis 226. Shielding plates and/or isolating foams may also be included to guard against incoming or outgoing emissions of electromagnetic frequencies of the example spherical electronic device 100. In addition, the chassis 226 may include input/output jacks, a power connector, or a USB port. However, as mentioned above, in some examples, the example spherical electronic device 100 may include a rechargeable internal battery for cordless operation.

The chassis 226 may include extrusions, protrusions, slots, or repositories that hold or are configured to couple with the one or more components. In some instances, the one or more components may mount to the chassis 226 through mechanical fasteners, snap-fit, adhesive coupling, or any other means or combination.

In addition to providing a platform onto which the one or more components are coupled, the chassis 226 may help dissipate heat within the assembly 102. For instance, when the one or more internal components (e.g., the PCBA 228) are coupled to the chassis 226, the chassis 226 may be configured to absorb and disperse heat generated. In doing so, the chassis 226 may help prevent the example spherical electronic device 100 from overheating. The chassis 226 may also include fins or other heat transferring surfaces that increase the rate of heat transfer. In some instances, the chassis 226 be manufactured from thermally conductive materials, such as Aluminum, Steel, Copper, Magnesium, etc.

The chassis 226 may be sized and configurable to be inserted through the opening 208 in the housing 103. Correspondingly, a largest cross-sectional dimension of the chassis 226 may be sized smaller than a largest cross-sectional dimension of the opening 208. In some instances, the one or more internal components (e.g., the PCBA 228) may be coupled to the chassis 226 outside of the housing 103 and then may be inserted into the internal cavity 200 via the opening 208. Once inserted, the chassis 226 may couple to the housing 103, such as the interior surface of the housing 103 (e.g., screws). However, in some instances, the one or more components may be coupled to the chassis 226 after the chassis 226 has been inserted into the housing 103.

Noted above, an exterior surface 236 of the chassis 226 may be configured to contact heat dissipating pads 238 within the internal cavity 200 of the housing 103. For instance, the heat dissipating pads 238 are shown in FIG. 2 as being deposed or otherwise coupled to the interior surface of the housing 103. To assist in dissipating heat, the exterior surface 236 of the chassis 226 may have flanges or portions that are shaped and sized corresponding to the interior surface of the housing 103. In doing so, heat generated by the one or more components may be further dissipated, via an interaction of the chassis 226 with the heat dissipating pads 238. In some instances, the heat dissipating pads 238 may be made of Copper (e.g., foil).

In some instances, when the chassis sub-assembly 204 is placed within the internal cavity 200 of the housing 103, the chassis sub-assembly 204, via the chassis 226, may couple or otherwise engage with the button and microphone sub-assembly 202. In doing so, processing of the one or more buttons 108 and/or the one or more microphones 212 may be communicatively coupled to the one or more components of the chassis sub-assembly 204 (e.g., PCBA 228). The chassis sub-assembly 204 may also assist in securing or providing support to the button and microphone sub-assembly 202 within the internal cavity 200.

The display sub-assembly 206 may, in some instances, include the display screen 112, a display frame 240, the camera 120, a heat sync 242, a grounding plate 244, and a flexible printed circuit board (FCPB) 246. The display screen 112, the camera 120, the heat sync 242, etc., may be designed to couple to the display frame 240, forming the display sub-assembly 206. To position or otherwise couple the camera 120 or the grounding plate 244 to the display frame 240, for instance, the display frame 240 may include slots 248 or other indentations. The slots 248 may receive the grounding plate 244, for instance, securing or supporting the grounding plate 244 to the display frame 240. In some instances, the slots 248 may also be configured to couple with portions of the chassis sub-assembly 204.

The display screen 112 may attach to the display frame 240 via adhesives or mechanical fasteners, for instance. The camera 120, the heat sync 242, and the grounding plate 244 may similarly attach to the display frame 240.

As mentioned previously, the display screen 112 may include a touch screen or interface in which a UI is presented. The display screen 112 may therefore receive input from a user and cause the example spherical electronic device 100 to perform certain operations. Accordingly, an exterior surface of the display screen 112, once coupled to the housing 103, may be outwardly facing from the internal cavity 200 of the housing 103.

The display screen 112 may also include a connector 250 configured to couple with other components of the assembly 102 and/or the example spherical electronic device 100, such as the PCBA 228 on the chassis sub-assembly 204 or via the FPCB 246. In addition, while FIG. 2 shows the display screen 112 as being circular, in some instances, the display screen 112 may include other shapes.

The display sub-assembly 206 may couple to the housing 103 through an attachment mechanism 252 disposed on the display frame 240 engaging with an attachment mechanism on the housing 103. Discussed in more detail in FIGS. 5A and 5B, the attachment mechanism 252 may be disposed around a perimeter, exterior, or periphery of the display frame 240. In some instances, the attachment mechanism 252 may resemble tabs, hooks, protrusions, keys, keyways, slots, or other male/female connectors. In addition, the attachment mechanism 252 may be sized to fit through the opening 208 of the housing 103 such that all or a portion of the display sub-assembly 206 may be disposed within the internal cavity 200 of the housing 103 or within the collar 116 of the opening 208.

To illustrate, once the display sub-assembly 206 is assembled (e.g., the display screen 112 and the camera 120 are attached to the display frame 240), the display sub-assembly 206 may be coupled to the housing 103 through inserting the display sub-assembly 206 within the opening 208 of the housing 103. When inserted through the opening 208, the display frame 240 may couple to the housing 103 via the attachment mechanism 252 on the display frame 240 interacting or otherwise engaging with the attachment mechanism on the housing 103. In some instances, the attachment mechanism 252 may engage with the attachment mechanism on the housing 103 through rotating the display sub-assembly 206. Once rotated, the attachment mechanism 252 may engage with the attachment mechanism on the housing 103, thereby coupling the display sub-assembly 206 to the housing 103. In some instances, the display sub-assembly 206 may be configured to rotate in predetermined amounts or distances to engage/disengage the display sub-assembly 206 and the housing 103.

To further couple the display sub-assembly 206 to the housing 103, one or more screws 254 may be disposed through the wall 114 of the housing 103 and into the display frame 240. Additional details of the attachment mechanism on the housing 103 is discussed below with regards to FIGS. 3A-3C.

As mentioned previously, the display screen 112, for instance, may have the connector 250 that electrically couples the display screen 112 to the PCBA 228. The camera 120 and/or other components of the display sub-assembly 206 may also be similarly connected to other components or sub-assemblies within the housing 103, for instance, via FPCB 246. To accomplish this, and to allow rotational movement of the display sub-assembly 206, the connector 250, for instance, may include enough slack or flex.

When the display sub-assembly 206 is coupled to the housing 103, the display screen 112 may be sized to be disposed within the opening 208. That is, in some instances the display screen 112 may be sized to fit within and substantially fill the opening 208 in order to be insertable through or fit within the opening 208. Therein, the display screen 112 may occupy an area within the opening 208, such as the collar 116 of the opening 208. Accordingly, when the display sub-assembly 206 is coupled to the housing 103, the internal cavity 200 of the housing 103 of the assembly 102 may be enclosed.

The housing 103 may also include a speaker box 256 disposed within the internal cavity 200. Within the speaker box 256 may be one or more loudspeakers (e.g., subwoofer or tweater). The speaker box 256 may project sound outward and away from the example spherical electronic device 100 and may include audio diffusers that radially disperse sound generated by the one or more loudspeakers.

To discuss the assembly of the assembly 102 of the example spherical electronic device 100, reference is now made to the Cartesian (X-Y-Z) coordinate system. Beginning with the button and microphone sub-assembly 202, the button and microphone sub-assembly 202 may be inserted into the opening 208 in the Z-direction and once disposed within the internal cavity 200, may be advanced in the Y-direction, so as to dispose the one or more buttons 108 through the one or more holes 218. The speaker box 256 may similarly be inserted through the opening 208 in the Z-direction and coupled to the housing 103. The chassis sub-assembly 204 may also be inserted through the opening 208 in the Z-direction. Accordingly, in the Y-direction, from a top to a bottom of the housing 103, the button and microphone sub-assembly 202 may be disposed above the chassis sub-assembly 204 and the speaker box 256 may be disposed beneath the chassis sub-assembly 204. That is, the chassis sub-assembly 204 may be interposed between the button and microphone sub-assembly 202 and the speaker box 256. Thereafter, the display sub-assembly 206 may couple to the housing 103 in the Z-direction, so as to cover the opening 208.

FIG. 2 also illustrates a bottom plate 258, which in some instances, may be positioned on the exterior surface 106 of the housing 103. The bottom plate 258 may include a seating element 260 disposed through the bottom plate 258. The bottom plate 258, via the seating element 260, may occupy a corresponding seating element on the stand 104, so as to position the housing 103 on the stand 104, as discussed above with regards to FIG. 1. However, in some instances, the bottom plate 258 may provide a flat a level surface (X-Y-Z plane) for the assembly 102. That is, in some instances, the assembly 102 may be operable without the stand 104 and the bottom plate 258 may help situate the assembly 102 within an environment.

Figure 3A:
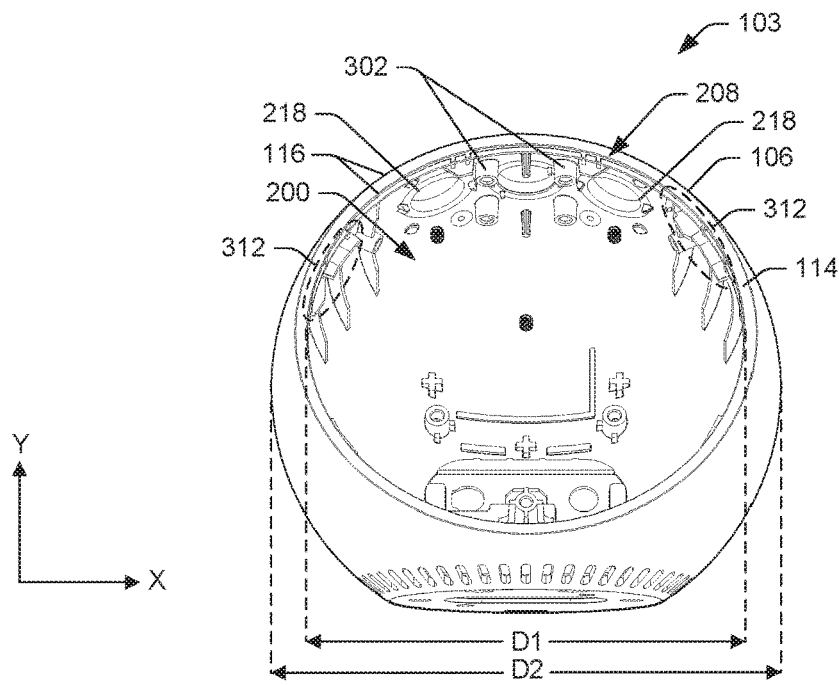
FIG. 3A is a first front view of a housing of the assembly of the example spherical electronic device of FIG. 1.
Figure 3B:
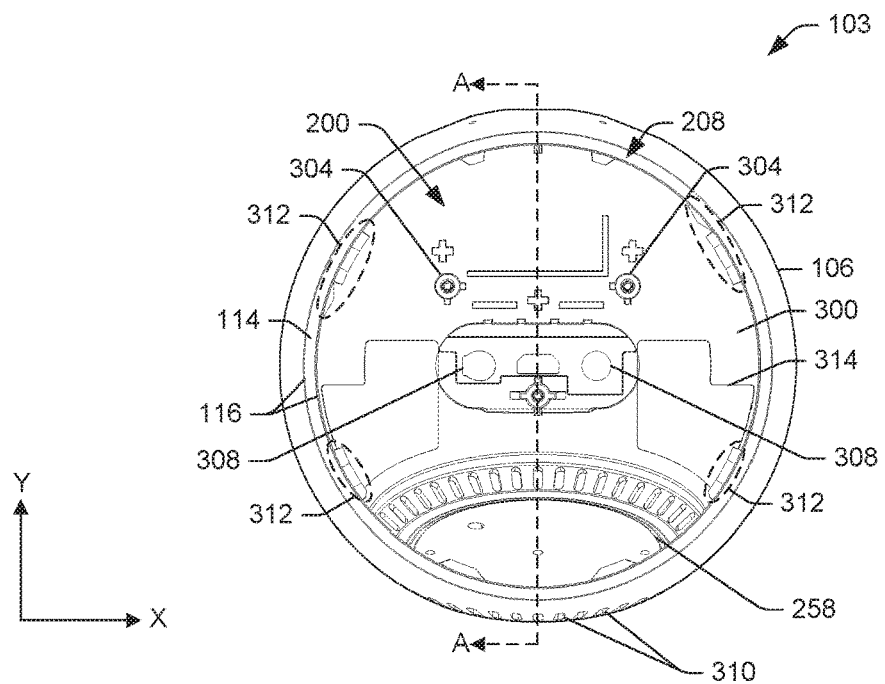
FIG. 3B is a second front view of the housing of the assembly of the example spherical electronic device of FIG. 1.
Figure 3C:
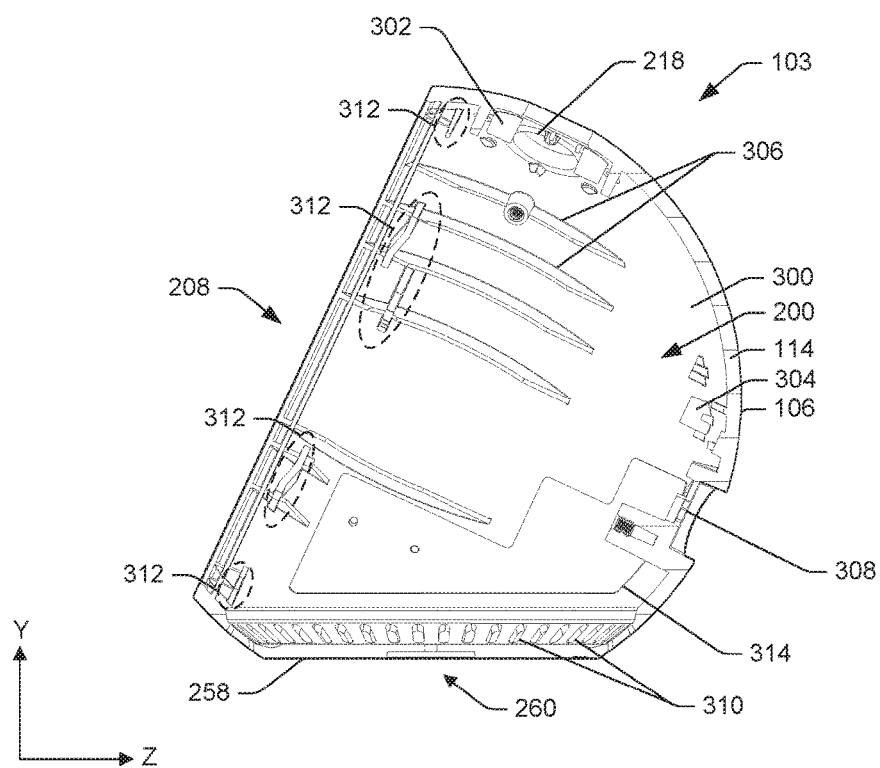
FIG. 3C is a cross-sectional view of the housing of the assembly of the example spherical electronic device of FIG. 1, taken along line A-A of FIG. 3B.

FIGS. 3A-3C represent front and cross-sectional views of the housing 103 of the assembly 102 of the example spherical electronic device 100. Particularly, FIGS. 3A and 3B illustrate front views of the housing 103 while FIG. 3C illustrates a cross-sectional view of the housing 103, taken along line A-A of FIG. 3B. FIGS. 3A-3C also show a Cartesian coordinate systems to discuss and illustrate positional or directional relationships of the housing 103.

The housing 103 may have the opening 208 disposed through the wall 114 of the housing 103, between the exterior surface 106 and an interior surface 300 of the housing 103. In some instances, the opening 208 may be circular. The opening 208 in the housing 103 may provide access to the internal cavity 200 of the housing 103. The collar 116 may be disposed around or surround the opening 103.

In some instances, portions of the housing 103 may be spherically-shaped. For instance, FIGS. 3A-3C illustrate that portions of the exterior surface 106 and portions of the interior surface 300 may be spherically-shaped, substantially spherically-shaped, or otherwise curved.

In some instances, the opening 208 may be a planar opening, such that the opening 208 extends through the housing 103 along an X-Y plane tilted in the Z-direction (X-Y-Z plane). In some instances, the X-Y plane on which the opening 208 extends through the housing 103 may be the front of the example spherical electronic device 100, a front of the assembly 102, or a front of the housing 103.

A diameter (D1) of the opening 208 may be sized smaller than a diameter (D2) of the exterior surface 106 of the housing 103. More generally, a largest cross-sectional distance of the opening 208 (e.g., D1) may be smaller than a largest cross-sectional distance of the housing 103 (e.g., D2). In doing so, the size of the opening 208 to the housing 103 may create an undercut within the internal cavity 200 of the housing 103.

The one or more holes 218 may be disposed through the wall 114 of the housing 103 in order to receive the one or more buttons 108. In some instances, the one or more holes 218, and accordingly, the one or more buttons 108 may be disposed on a top of the housing 103 (X-Z plane spaced in the Y-direction).

In some instances, the one or more holes 218 may correspond to the position of the opening 208. For instance, in the Y-direction, a centerline of the one or more holes 218 may be parallel but non-planar with the opening 208 in the housing 103. Accordingly, when depressed, the one or more buttons 208 may extend in a direction that is substantially parallel the opening 208 and/or the collar 116.

The interior surface 300 of the housing 103 may include one or more columns 302, one or more foots 304, and/or one or more ribs 306. In some instances, the one or more columns 302 and the one or more foots 304 may assist in coupling the sub-assemblies to the housing 103 of the assembly 102. By way of illustration, one or more screws may extend through the button and microphone sub-assembly 202 and into the one or more columns 302, thereby coupling the button and microphone sub-assembly 202 to the housing 103. Similarly, one or more screws may extend through the chassis sub-assembly 204 and into the one or more foots 304 to couple the chassis sub-assembly 204 to the housing 103.

The one or more ribs 306 may center the chassis sub-assembly 204 within the internal cavity 200 of the housing 103. In some instances, the one or more ribs 306 may assist in dissipating and transferring heat away from the internal components of the housing 103. However, in some instances, other protrusions and/or indentations may be disposed on the interior surface 300 of the housing 103. In addition, the one or more columns 302 and the one or more foots 304 may also serve to align, situate, or otherwise position the sub-assemblies in the housing 103.

As mentioned above, the assembly 102 of the example spherical electronic device 100 may include input/output ports, such as a power port. Accordingly, the housing 103 may have ports 308 disposed through the wall 114 of the housing 103. The ports 308 may be aligned with corresponding components on the chassis sub-assembly 204, for instance, to receive power for the assembly 102. However, while on the power port has been described, other ports, such as an audio jack or a USB port may be included.

In some instances, the ports 308 may be disposed through a back of the housing 103, along a X-Y plane spaced in the Z-direction away from the X-Y plane in which the opening 208 extends through the housing 103 (e.g., a front of the assembly 102 and/or the housing 103).

The housing 103 may have the bottom plate 258 with the seating element 260 that is recessed into or positioned on the exterior surface 106 of the housing 103. In some instances, the bottom plate 258 may be disposed on a bottom of the housing 103 (on a X-Z plane spaced apart from an X-Z plane of the top of the housing 103 in the Y-direction). In some instances, the bottom of the housing 103 may be planar so as to create a mounting surface for the bottom plate 258 and/or to allow the assembly 102 to evenly on a surface (i.e., flat).

As mentioned above, the opening 208 of the housing 103 may be planar. In some instances, the opening 208 may be disposed through a X-Y plane that is at an acute angel relative to X-Z plane of the bottom of the housing 103 or the bottom plate 258.

Orifices 310 may extend through the wall 114 of the housing 103. In some instances, the orifices 310 may be proximate to the bottom of the housing 103 or the base plate 258 of the housing 103. The orifices 310 may also encircle a circumference of the housing 103 and may be evenly spaced apart from one another. In some instances, the orifices 310 may serve to output sound generated by the assembly 102 of the example spherical electronic device 100, such as sound emitted by a loudspeaker within the speaker box 256. In some instances, the loudspeaker disposed with the speaker box 256 may be oriented towards the orifices 310.

To couple the display sub-assembly 206 to the housing 103, the housing 103 may include an attachment mechanism 312 that engages with the attachment mechanism 252 on the display frame 240. The attachment mechanism 312 may be disposed proximate to the opening 208 and in some instances, may extend into the opening 208. That is, as shown in FIGS. 3A and 3B, a portion of the attachment mechanism 312 may be disposed within a circumference of the collar 116.

The attachment mechanism 312 may encircle the opening 208 and may include multiple attachment mechanisms that are spaced around the opening 208. For instance, the attachment mechanism 312 is shown as including four attachment mechanisms that are spaced around the opening 208. In some instance, the attachment mechanisms may be equidistantly spaced around the opening 208 or may be positioned or oriented differently than that illustrated in FIG. 3B, for instance. Additionally, although FIG. 3B illustrates that the attachment mechanism 312 includes four protrusions, more or less than four attachment mechanisms may be included on the housing 103.

Similar to the attachment mechanism 252 on the display frame 240, the attachment mechanism 312 may include a slot, tab, key, keyway, or other male and/or female connectors. Accordingly, the attachment mechanism 252 on the display frame 240 and the attachment mechanism 312 on the housing 103 may be complimentary to one another to couple the display sub-assembly 206 to the housing 103 of the assembly 102. For instance, the attachment mechanism 252 on the display frame 240 may include a tab and the attachment mechanism 312 on the housing 103 may include a slot. Accordingly, when the display sub-assembly 206 is placed through the opening 208, the tab on the display frame 240 may engage with a surface of the slot on the housing 103. However, other combinations may also be used. For instance, furthering from the above, rather than the housing 103 having the slot as the attachment mechanism 312, the housing 103 may include a corresponding tab that engages with the tab on the display frame 240.

In some instances, to couple the display sub-assembly 206 to the housing 103, the display sub-assembly 206 may be rotated into the housing 103, thereby engaging the attachment mechanism 252 on the display frame 240 with the attachment mechanism 312 on the housing 103. For instance, FIG. 3C illustrates that the attachment mechanism 312 on the housing 103 may include extrusions that curve from a first position on a first X-Y-Z plane to a second X-Y-Z plane. Therein, the attachment mechanism 252 on the display frame 240 may engage with the attachment mechanism 312 on the housing 103, so as bring the attachment mechanism 252 into contact with the attachment mechanism 312.

To remove the display sub-assembly 206 from the housing 103, the display sub-assembly 106 may be rotated in a different direction than used to couple the display sub-assembly 206 to the housing 103. However, the display sub-assembly 206 may also be coupled and de-coupled to the housing 103 through other methods, such as snap-fit, fasteners, adhesives, etc.

In some instances, to couple the display sub-assembly 206 to the housing 103, the display sub-assembly 206 may be configured to rotate ten degrees clockwise. To decouple the display sub-assembly 206 from the housing 103, the display sub-assembly 206 may be configured to rotate 10 degrees counterclockwise.

The internal cavity 200 of the housing 103 may include heat dissipating plates 314. In some instances, the heat dissipating plates 314 may be coupled to the interior surface 300 of the housing 103. When the display sub-assembly 206 is inserted into the internal cavity 200, the chassis 226 may contact or otherwise couple to the heat dissipating plates 314, assisting in dissipating heat generated by the assembly 102 and/or the example spherical electronic device 100.

Figure 4A:
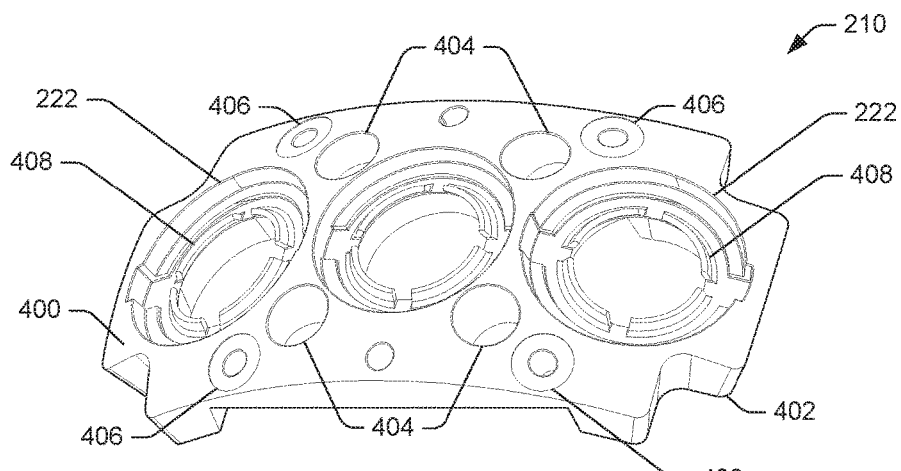
FIG. 4A is a perspective view of a button mount disposed within the housing of the assembly of the example spherical electronic device of FIG. 1.
Figure 4B:
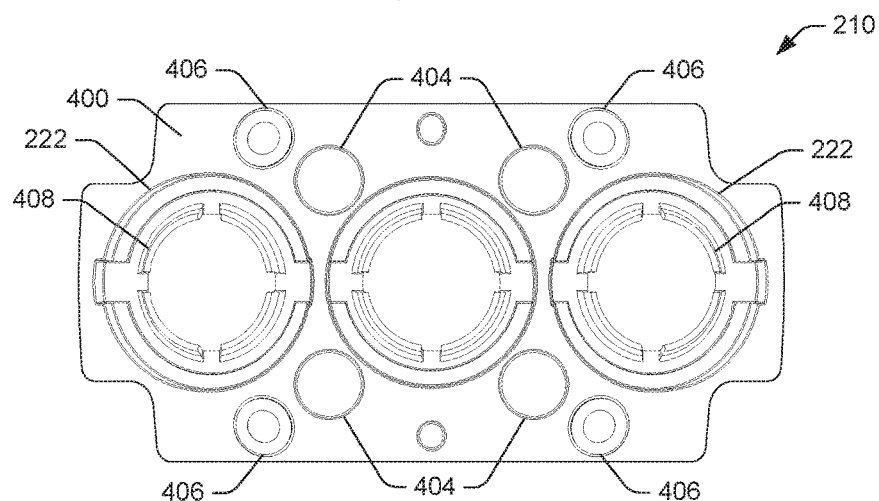
FIG. 4B is a top view of the button mount disposed within the housing of the assembly of the example spherical electronic device of FIG. 1.
Figure 4C:
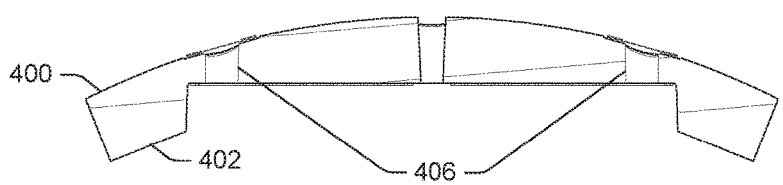
FIG. 4C is a side view of the button mount disposed within the housing of the assembly of the example spherical electronic device of FIG. 1.

FIGS. 4A-4C illustrate perspective, top, and side views of the button mount 210 that is disposed within the housing 103 of the assembly 102, respectively. In some instances, the button mount 210 may have a top surface 400 and a bottom surface 402, with a thickness of the button mount 210 extending therebetween. To adjoin or otherwise couple to the interior surface 300 of the housing 103, which in some instances may be curved, the top surface 400 of the button mount 210 may have a corresponding curved profile. That is, the top surface 400 of the button mount 210 may have a similar or substantially similar radius of curvature as the interior surface 300 of the housing 103. Thus, the top surface 400 of the button mount 210 may couple directly adjacent to the interior surface 300.

To position and/or couple the button mount 210 to the housing 103, the button mount 210 may have one or more notches 404 that are aligned, sized, and configured to receive the one or more columns 302 protruding from the interior surface 300 of the housing 103. In some instances, a column of the one or more columns 302 may be insertable into a corresponding notch of the one or more notches 404.

The button mount 210 may include the one or more receptacles 222 that when coupled to the housing 103, may co-centrically align with the one or more holes 218 disposed through the wall 114 of the housing 103. The one or more holes 218 may be sized and configured to receive the one or more buttons 108.

As alluded to previously, one or more microphone ports 406 may be disposed through the button mount 210. In some instances, the one or more microphone ports 406 on the button mount 210 may align with the one or more microphone ports 110 disposed through the housing, to transfer sound to the one or more microphones 212 within the assembly 102.

In some instances, the one or more receptacles 222 may also include one or more flanges 408 located within an interior of the one or more receptacles 222. When the button and microphone sub-assembly 202 is assembled, the one or more flanges 408 may be in contact or support the one or more buttons 108. Additionally, the one or more flanges 408 may provide mechanical action to the one or more buttons 108.

Figure 5B:
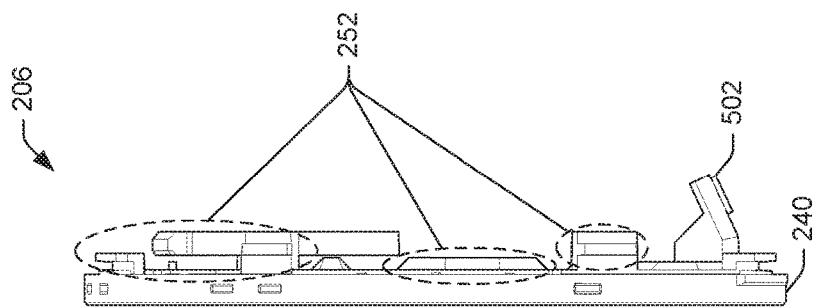
FIG. 5B is a side view of the display sub-assembly of the assembly of the example spherical electronic device of FIG. 1.
Figure 5A:
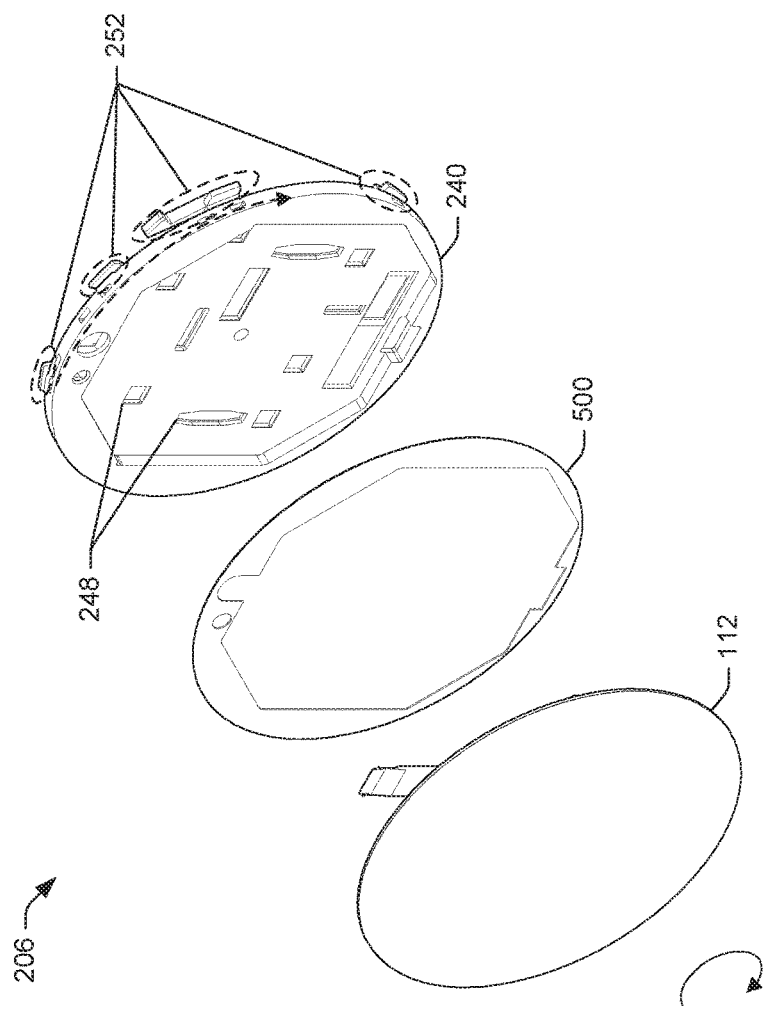
FIG. 5A is a partially exploded perspective view of a display sub-assembly of the assembly of the example spherical electronic device of FIG. 1.

FIGS. 5A & 5B illustrate partially exploded perspective and side views of the display sub-assembly 206, respectively. As shown, the display sub-assembly 206 may include the display screen 112, the display frame 240, and an adhesive layer 500 that may couple the display screen 112 to the display frame 240. As shown, the display screen 112, the display frame 240, and the adhesive layer 500 may be circular in shape to be disposed within the opening 208 when the display sub-assembly 206 is coupled to the housing 103 of the assembly 102. For instance, as mentioned above, the display sub-assembly 206 may couple to the housing 103 when the display sub-assembly 206 is rotated into the housing 103 (shown by the arrow in FIG. 5A).

The attachment mechanism 252 included on the display frame 240 may include tabs or hooks that protrude from the display frame 240. In some instances, the attachment mechanism 252 may be oriented around a periphery or exterior perimeter of the display frame 240. To couple the display sub-assembly 206 to the housing 103, the attachment mechanism 252 may be complimentary with the attachment mechanism 312 disposed on the housing 103. While FIGS. 5A & 5B illustrate that the attachment mechanism 252 may include tabs or hooks that engage with the attachment mechanism 312 on the housing, as mentioned above, other complimentary attachment mechanisms may be included.

The display frame 240 may include the slots 248 that are configured to receive portions of the display sub-assembly 206 and/or the chassis sub-assembly 204. For instance, the slots 248 may receive extrusions on the chassis 226 of the chassis sub-assembly 204 or the FPCB 246 of the display sub-assembly 206.

The display frame 240 may also include an extension 502 projecting outward at a surface/side of the display frame 240 not coupled to the display screen 112. In some instances, the extension 502 may be used to further secure the display sub-assembly 206 to housing 103. For instance, a screw (e.g., the one or more screws 254 or other mechanism fastener may be disposed through the wall 114 of the housing 103 and into the extension 502.

Figure 6A:
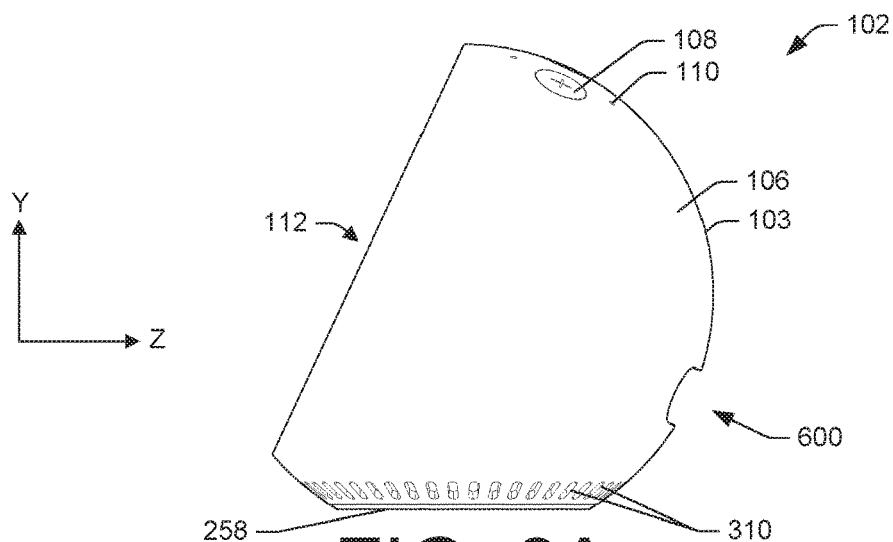
FIG. 6A is a side view of the assembly of example spherical electronic device of FIG. 1.
Figure 6B:
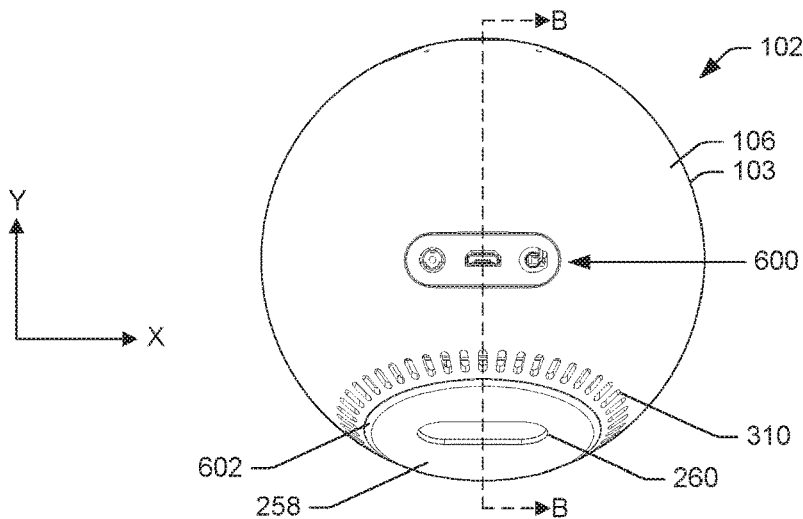
FIG. 6B is a rear view of the assembly of the example spherical electronic device of FIG. 1.
Figure 6C:
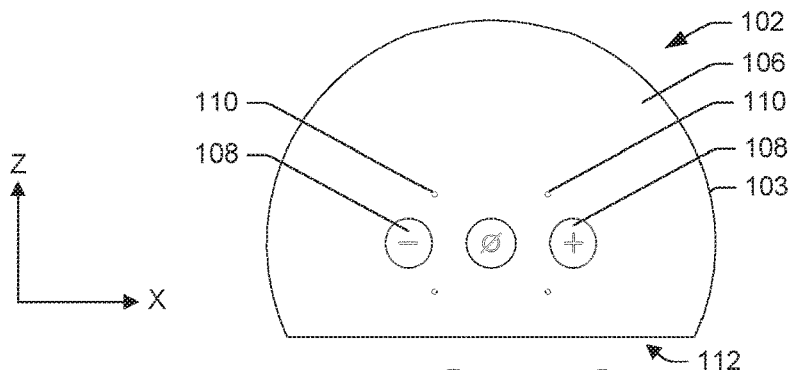
FIG. 6C is a top view of the assembly of the example spherical electronic device of FIG. 1.

FIGS. 6A-6C illustrate side, back, and top views of the assembly 102 of the example spherical electronic device 100, respectively. Shown in FIGS. 6A-6C, the housing 103 of the assembly 102 may include a partially or substantially spherically-shaped exterior surface 106 having the display screen 112 that extends through the opening 208 in the exterior surface 106. As illustrated in FIGS. 6A and 6C, in some instances, the display screen 112 may be planar to the exterior surface 106 of the housing 103 of the assembly 102.

The assembly 102 of the example spherical electronic device 100 may include the one or buttons 108, the one or more microphone ports 110, and the orifices 310 that extend through the exterior surface 106 of the housing 103. In some instances, the one or more buttons 108 and the one or more microphone ports 110 may be disposed on the top of the assembly 102. That is, the top of the assembly 102 may be along an X-Z plane that is spaced apart from the bottom of the assembly 102 in the Z-direction in which the orifices 310 encircle the bottom plate 258. In some instances, the one or more buttons 108 may follow a trajectory of the exterior surface 106 of the housing 103, to be disposed along an arc that follows the exterior surface 106. In addition, in some instances, the one or more buttons 108 may be equidistantly spaced from one another.

In some instances, the ports 308 of the assembly may be disposed within a recession 600 of the exterior surface 106 of the housing 103.

FIG. 6B illustrates that the bottom plate 258 may include the seating element 260 that is complimentary to engage the seating element on the stand 104. While FIG. 6B shows the seating element 260 as being ovular in shape, other shapes may be included, such as being rectangular.

A rubber grommet or O-ring 602 may also encircle or be placed on the bottom plate 258 to provide a cushioned interface between the housing 103 and the stand 104. In some instances, the O-ring 602 may dampen or absorb vibrations from the housing 103 and prevent the assembly 102 of the example spherical electronic device 100 from rattling during use.

FIG. 7 illustrates a cross-sectional view of the assembly 102 taken along line B-B of FIG. 6B, showing the sub-assemblies disposed within the internal cavity 200 of the housing 103. That is, when assembled, the button and microphone sub-assembly 202, the chassis sub-assembly 204, and the display sub-assembly 206 may be disposed within the housing 103 of the assembly 102.

To briefly discuss, FIG. 7 shows that on the top of the assembly 102 (along a X-Z plane spaced apart in the Y-direction from a X-Z plane of the bottom) the one or more buttons 108 may be disposed through the wall 114 of the housing 103. In some instances, the one or more buttons 108 may be disposed through the one or more receptacles 222 of the button mount 210. In addition, an exterior surface of the one or more buttons 108, such as an exterior surface of the button caps 220 may be substantially flush or aligned with the exterior surface 106 of the housing 103.

The chassis sub-assembly 204 may be disposed within the internal cavity 200 of the housing 103 and behind the display sub-assembly 206 (in the Z-direction). In some instances, the display sub-assembly 206 may be disposed within the collar 116 of the opening 208 of the housing 103 to create a substantially flush exterior profile of the assembly 102. In some instances, the display frame 240 may be recessed within the opening 208 such that the display screen 112 is substantially flush with the collar 116 of the opening 208.

FIG. 7 also illustrates that portions of the display sub-assembly 206 may contact or couple to portions of the chassis sub-assembly 204, such as the display frame 240 coupling with the chassis 226. As discussed previously, the display sub-assembly 206 may couple to the housing 103 via an engagement 700 between the attachment mechanism 252 on the display frame 240 and the attachment mechanism 312 on the housing 103.

Once assembled, the assembly 102 may resemble a compact enclosure, potentially minimizing a size of the example spherical electronic device 100. That is, in some instances, there may exist little space within the internal cavity 200, for instance, between the interior surface 300 of the housing 103 and the chassis 226.

Example Cylindrical Electronic Device

Figure 8:
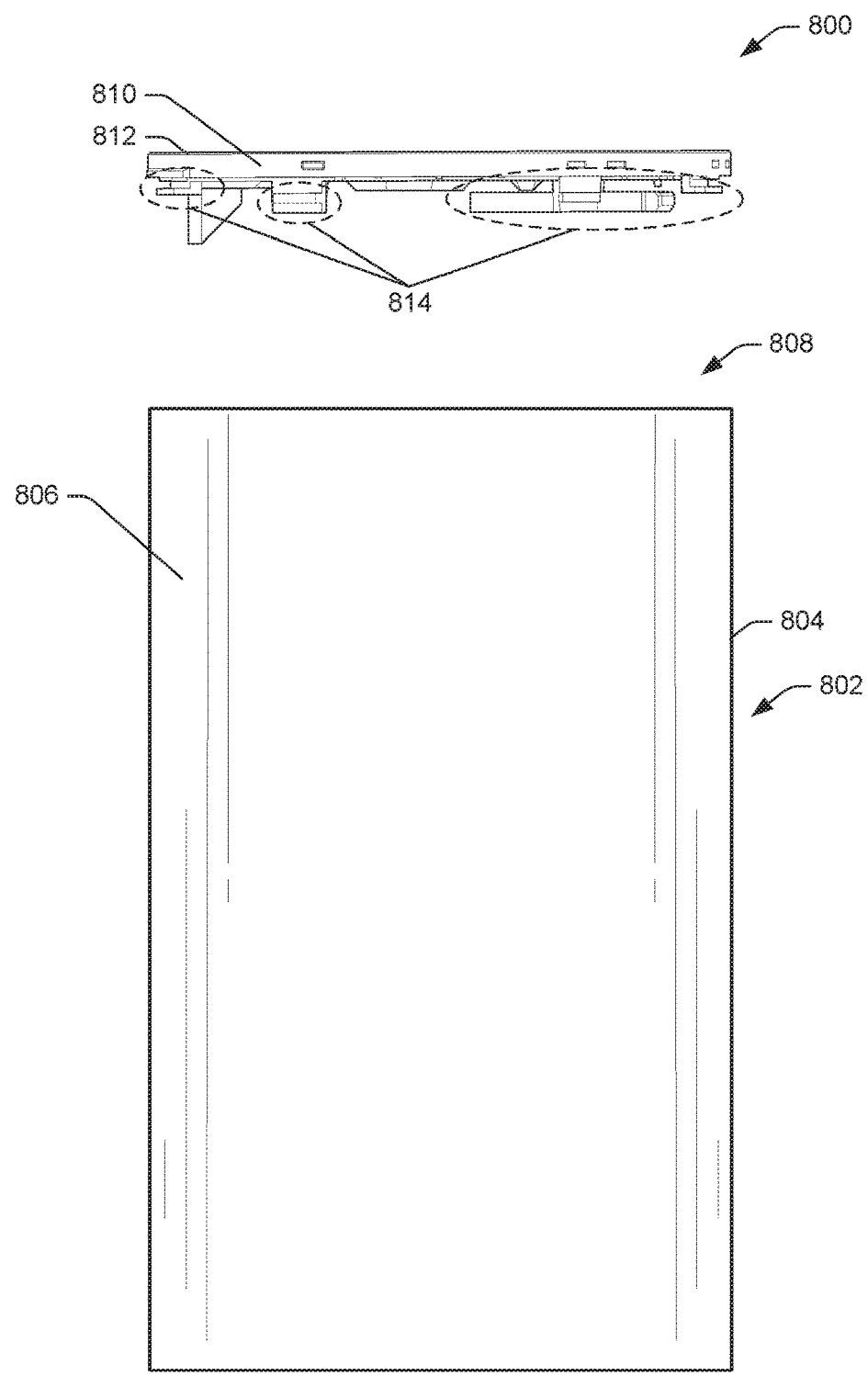
FIG. 8 is a side view of an example cylindrical electronic device.

FIG. 8 illustrates an example cylindrical electronic device 800. In some instances, the example cylindrical electronic device 800 may have similar or different components than the example spherical electronic device 100, as previously discussed herein. For instance, while the housing 103 of the assembly 102 of the example spherical electronic device 100 was shown as having a spherically-shaped exterior surface 106, an assembly 802 of the example cylindrical electronic device 800 may have a housing 804 that has a cylindrically-shaped exterior surface 806. FIG. 8 also shows that in some instances, the example cylindrical electronic device 800 may not include a stand on which the example cylindrical electronic device 800 mounts (e.g., the stand 104 of FIG. 1).

At an end of the example cylindrical electronic device 800, an opening 808 may be included through the housing 804. A display sub-assembly 810 may be disposed within the opening 808 and couple to the housing 804 of the assembly 802 of the example cylindrical electronic device 800. The display sub-assembly 810 may include similar components as the display sub-assembly 206, such as a display screen. Similarly, in some instances, the display sub-assembly 810 may include a display frame 812 that couples to the housing 804, for instance, via attachment mechanism 814 disposed on the display frame 812 engaging with a corresponding or complimentary attachment mechanism disposed within an interior and/or on the housing 804.

An interior or hollow portion of the housing 804, disposed beneath the opening 808 may have similar components as the housing 103 of the assembly 102 of the example spherical electronic device 100. For instance, the housing 804 may include PCBs, one or more microphones, loudspeakers, etc. and hardware and components that enable their operation.

CONCLUSION

While various examples and embodiments are described individually herein, the examples and embodiments may be combined, rearranged and modified to arrive at other variations within the scope of this disclosure. In addition, although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An electronic device comprising:
   a hollow housing including:
      a wall;
      a circular opening disposed through the wall; and
      a first attachment mechanism positioned on the hollow housing proximate to the circular opening; and
   a display assembly including:
      a circular display screen;
      a display frame coupled to the circular display screen, the display frame being disposed within the circular opening, the display frame having a second attachment mechanism configured to engage the first attachment mechanism via a rotational movement of the display assembly relative to the hollow housing to secure the display assembly to the hollow housing.

2. The electronic device of claim 1, wherein at least a portion of the wall is spherically-shaped, and wherein a circumference of the circular opening is smaller than a circumference of the portion of the wall that is spherically-shaped.

3. The electronic device of claim 1, wherein:
   the first attachment mechanism includes at least one of a tab or a slot; and
   the second attachment mechanism includes at least another of the tab or the slot.

4. The electronic device of claim 1, wherein:
   the first attachment mechanism and the second attachment mechanism are configured to engage when the display assembly is rotated in a first direction relative to the housing; and
   the first attachment mechanism and the second attachment mechanism are configured to disengage when the display assembly is rotated in a second direction relative to the housing.

5. The electronic device of claim 1, wherein at least a portion of the wall is spherically shaped, and
   the electronic device further comprises a button assembly disposed within the hollow housing, the button assembly including:
      a first button extending through the spherically-shaped portion of the wall and having an exterior surface, wherein the exterior surface of the first button is oriented tangentially to the spherically-shaped portion of the wall; and
      a second button spaced from the first button and extending through the spherically-shaped portion of the wall and having an exterior surface, wherein the exterior surface of the second button is oriented tangentially to the spherically-shaped portion of the wall.

6. The electronic device of claim 1, wherein the display assembly is recessed within the circular opening such that the circular display screen is substantially flush with a rim of the circular opening.

7. An electronic device comprising:
   a housing including a substantially spherically-shaped wall portion and a first attachment mechanism, the substantially spherically-shaped wall portion having:
      an interior surface;
      an exterior surface; and
      an annulus surrounding a circular opening which extends through at least a portion of the substantially spherically-shaped wall portion, wherein a circumference of the circular opening is smaller than a circumference of the substantially spherically-shaped wall portion; and
   a display assembly disposed in the circular opening and including a second attachment mechanism, wherein the first attachment mechanism and the second attachment mechanism are configured to engage via a rotational movement of the display assembly relative to the housing to couple the display assembly to the housing.

8. The electronic device of claim 7, wherein the housing comprises a single piece, seamless housing.

9. The electronic device of claim 7, wherein the display assembly comprises:
   a display screen; and
   a display frame disposed within the circular opening and coupling the display screen to the housing.

10. The electronic device of claim 9, wherein the display screen is circular and is substantially flush with a rim of the circular opening.

11. The electronic device of claim 7, wherein:
the first attachment mechanism includes at least one of a tab or a slot; and
the second attachment mechanism includes at least another of the tab or the slot.

12. The electronic device of claim 7, wherein the housing further includes:
a first button extending through the substantially spherically-shaped portion of the wall, wherein the first button includes an exterior surface oriented tangentially to a portion of the exterior surface of the substantially spherically-shaped portion of the wall proximate to the first button; and
a second button extending through the substantially spherically-shaped portion of the wall, wherein the second button includes an exterior surface oriented tangentially to a portion of the exterior surface of the substantially spherically-shaped portion of the wall proximate to the second button.

13. The electronic device of claim 12, wherein:
the exterior surface of the first button is substantially flush with the exterior surface of the substantially spherically-shaped portion of the wall; and
the exterior surface of the second button is substantially flush with the exterior surface of the substantially spherically-shaped portion of the wall.

14. A device, comprising:
a housing including:
a substantially spherically-shaped wall portion having:
an interior surface;
an exterior surface; and
multiple button holes extending through the substantially spherically-shaped wall portion, the multiple button holes including at least a first button hole and a second button hole;
multiple buttons including at least a first button disposed in the first button hole and a second button disposed in the second button hole, the first button having an exterior surface and the second button having an exterior surface, wherein the exterior surface of the first button is substantially tangent to a portion of the exterior surface of the housing proximate the first button hole and the exterior surface of the second button is substantially tangent to a portion of the exterior surface of the housing proximate the second button hole; and
a button mount attached to the interior surface of the housing, the button mount having a curved exterior surface substantially matching a curvature of the interior surface of the spherically-shaped wall portion, the button mount having:
a first receptacle for accommodating and guiding the first button for travel in a first direction substantially perpendicular to the exterior surface of the first button; and
a second receptacle for accommodating and guiding the second button for travel in a second direction substantially perpendicular to the exterior surface of the second button, the second direction of travel being different than the first direction of travel; and
a display assembly coupled to the housing.

15. The device of claim 14, wherein:
the substantially spherically-shaped wall portion further includes a third button hole;
the housing further includes a third button having an exterior surface, wherein the exterior surface of the third button is substantially tangent to a portion of the exterior surface of the housing proximate the third button hole; and
the button mount further includes a third receptacle for accommodating and guiding the third button for travel in a third direction substantially perpendicular to the exterior surface of the third button, the third direction of travel being different than the first direction of travel and the second direction of travel.

16. The device of claim 15, wherein the multiple buttons are aligned along a button arc that parallels the exterior surface of the substantially spherically-shaped wall portion, and wherein the multiple buttons are equidistantly spaced along the button arc.

17. The device of claim 14, wherein:
the substantially spherically-shaped wall portion further includes a circular opening; and
the display assembly includes a circular display screen that is disposed within the circular opening.

18. The device of claim 14, wherein:
the housing further includes:
an annulus encircling a circular opening that extends through the substantially spherically-shaped wall portion; and
first attachment mechanism positioned proximate to the circular opening; and
the display assembly includes a display frame having a second attachment mechanism to engage the first attachment mechanism to secure the display assembly to the housing.

19. The device of claim 18, wherein a circumference of the circular opening is smaller than a circumference of the substantially spherically-shaped wall portion.

20. The electronic device of claim 7, wherein at least a portion of the first attachment mechanism extends into the circular opening.

* * * * *